INVENTORS
D. L. SNOW
W. W. HANSEN

Patented Aug. 3, 1954

UNITED STATES PATENT OFFICE 2,685,125

2,685,125

METAL-TO-METAL SEALS IN ELECTRON DISCHARGE TUBES

William W. Hansen, Stanford University, and Donald L. Snow, San Carlos, Calif., assignors to Sperry Corporation, a corporation of Delaware Original application December 10, 1942, Serial No. 468,603, now Patent No. 2,456,653, dated December 21, 1948. Divided and this application October 16, 1948, Serial No. 54,872

4 Claims. (Cl. 29—196.6)

This invention relates to seals between metal alloys and methods of making them, and is particularly concerned with the making of efficient seals in electronic and like devices. In electronic apparatus it is frequently desired to make many of the metallic current carrying components of a cobalt-nickel-iron alloy of the type known variously by such trade names as Kovar and Fernico. This alloy is used because it has an extremely low coefficient of thermal expansion and lends itself readily to adaptability in electronic apparatus.

According to one phase of the invention we have solved problems encountered during the operations of soldering members made of the above-considered cobalt-nickel-iron alloy to other metal parts. These joints must be mechanically strong and vacuum tight.

In securing such alloy members together or to another metal we preferably employ a soldering operation, using a solder having an appreciable silver content and a relatively high melting point. We have found that this silver solder has an extremely high affinity for the nickel-cobalt-iron alloy, and rapidly enters into combination with it. This high affinity of silver solder for the alloy apparently results in an alloying action between the cobalt-nickel-iron alloy and the silver in the solder, whereby the alloy member develops a relatively large newly alloyed and relatively brittle weakened section which may crack to destroy the vacuum when subjected to temperature variations and other stresses during normal operation.

According to another important phase of the invention, we have developed new methods for silver soldering a member made of cobalt-nickel-iron alloy whereby the mechanical strength of this member is not impaired by the soldering operation.

With the above in mind it is a major object of the invention to provide a novel method of connecting a metal member in gas tight relation with another metal member and a glass body.

It is a further object of the invention to provide a high frequency device having efficient durale novel sealed joints which are resistant to the thermal and mechanical stresses encountered during normal operation of the device.

A further object of the invention is to provide a novel joint between two metal surfaces connected by a solder containing a metal which is readily alloyable with one or both of said surfaces, wherein formation of the alloy is avoided, and methods of making such a joint.

A further object of the invention is to provide a novel joint between two metal surfaces connected by a solder containing a metal which is readily alloyable with at least one of said surfaces, wherein formation of the alloy is avoided by first coating said one surface with a metal which prevents the solder from contacting said one surface.

A further object of the invention is to provide a novel method of silver soldering a cobalt-nickel-iron alloy wherein the alloy surface is coated before soldering with a layer of nickel or an equivalent protective coat.

Further objects of the invention will presently appear as the description proceeds in connection with the appended claims and the annexed drawings wherein:

This application is a division of our Patent No. 2,456,653, dated December 21, 1948.

Figure 1:
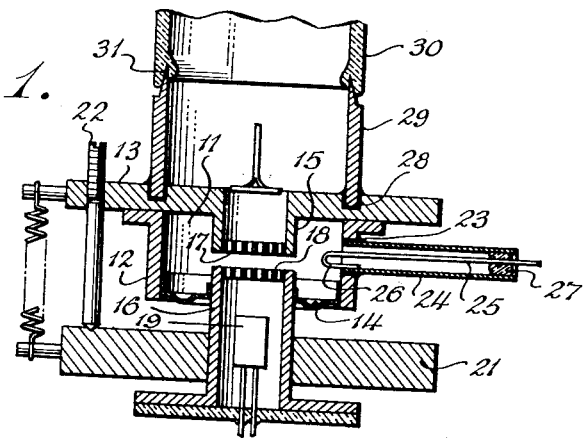
Fig. 1 is a sectional view illustrating an electron tube embodying the invention.

Referring now more particularly to the figures, Fig. 1 illustarates the invention as applied to a tunable high frequency electronic tube of the type employing a hollow resonator and a concentric transmission line.

The hollow resonator 11 comprises a cylindrical metal barrel 12 and opposite end walls 13 and 14 provided with reentrant poles 15 and 16 supporting centered and aligned grids 17 and 18. A suitable cathode 19 is located within pole 16 near grid 18.

Wall 14 is an annularly crimped sheet metal member of beryllium copper or a like resilient fatigue resistant material having sufficient stiffness to normally maintain its shape but being controllably deformable for tuning. Wall 14 is secured permanently, preferably by soldering, to barrel 12 and pole 16.

A metal plate 21 is rigid with pole 16 below wall 14 and parallel to wall 13. Wall 13 and plate 21, which may be of steel, copper or any suitable metal, are interconnected by the usual springs (only one shown) urging them together and by adjustable tuning screws such as 22. As screws 22 are rotated, the distance between grids 17 and 18 is changed to tune the hollow resonator. Plate 21 is carried by the usual base (not shown).

The wall of barrel 12 is apertured at 23 to receive a hollow tube 24 comprising the outer conductor of a concentric transmission line. The inner conductor 25 is reversely bent within the resonator to provide an antenna loop 26, and is anchored, as by soldering, to the inner periphery of outer conductor 24. Conductors 24 and 25 are preferably made of a cobalt-nickel-iron alloy such as Kovar, Fernico, or the like.

Conductor 25 is a relatively stiff wire held firmly centrally in the transmission line assembly by an annular seal 27 of glass or some other rigid highly insulating material, which also forms a gas tight seal for the conductor.

Wall 13 is formed with an annular groove 28 in which is seated and soldered one end of a cylindrical barrel 29, preferably of Kovar or its above mentioned equivalents. The other end of barrel 29 is enclosed by a glass envelope 30 sealed thereto along rim 31 so that the interior of the tube is gas tight for evacuation to operating condition.

The above discussed problems of making efficient gas tight joints capable of withstanding the thermal and other mechanical strains attendant to operation of such ultra high frequency apparatus have chiefly been solved by the invention, as embodied in the above, and the solutions will be explained in detail below.

Figure 2:
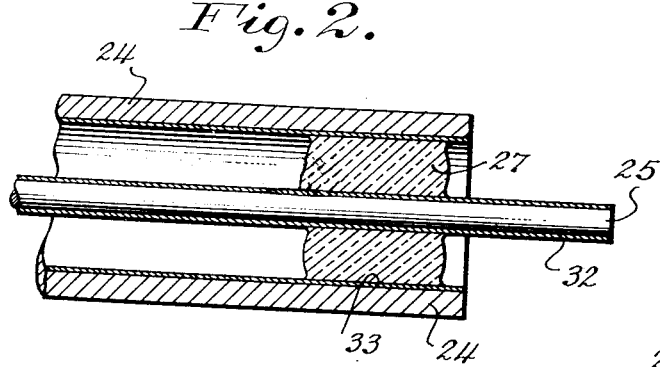
Fig. 2 is an enlarged section of the Kovar-glass joint in the transmission line of Fig. 1.

Fig. 2 illustrates a greatly enlarged section through the glass-to-metal seal 27 in the concentric transmission line of Fig. 1. Such a glass-to-metal seal is particularly claimed in our patent No. 2,456,653.

Figure 3:
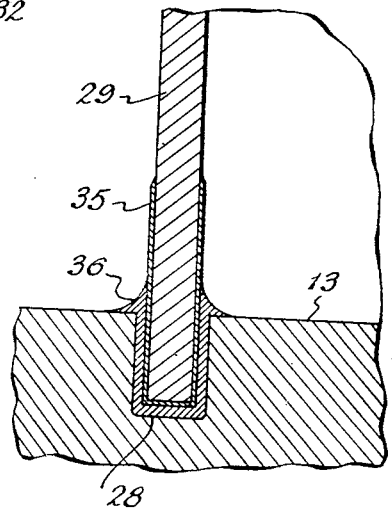
Fig. 3 is an enlarged section illustrating the soldered metal to metal joint where the transmission line of Fig. 1 enters the resonator.

Fig. 3 is an exaggerated sectional representation of the metal-to-metal joint between the Kovar tube barrel 29 and wall 13. The lower edge and periphery of collar 29 are coated, as by distillation or electrodeposition, with a layer of nickel 35. The nickel-plated end of collar 29 is inserted and silver soldered in the usual manner in groove 28, the hardened solder body being indicated at 36 in Fig. 3.

This above soldered joint is sound and firm, and the barrel does not fracture under repeated temperature stress. The nickel coating does not rapidly alloy with the silver in the solder, and prevents the silver from reaching the Kovar. It is obvious that any suitable metal other than nickel may be used to plate the Kovar. It is essential, however, that such metal be capable of forming a good solder bond and also serve as a protective shield for preventing the silver solder from alloying with the Kovar. The metal plating should, of course, have a higher melting point than the solder. One such metal which might be used in place of nickel is palladium.

Figure 4:
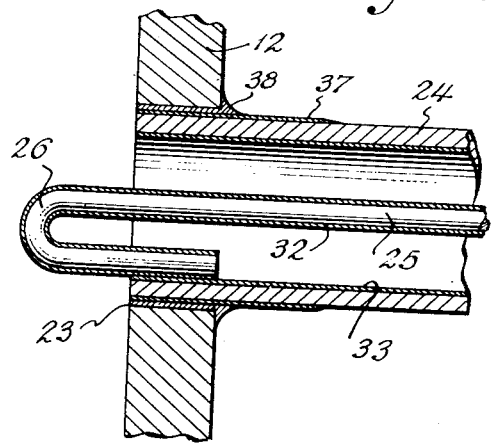
Fig. 4 is another enlarged section illustrating the soldered metal to metal joint between the tube barrel and the resonator.

Fig. 4 is an exaggerated sectional illustration of the manner in which Kovar conductor 24 is mounted on barrel 12. Prior to insertion into aperture 23, the associated end of conductor 24 is coated on its external periphery, preferably by electrodeposition, with a layer 37 of nickel. The plated end of conductor 24 is thrust into aperture 23 and silver soldered in the usual manner, the hardened body of solder being indicated at 38.

The phase of the invention related to Figs. 3 and 4 is of especial application and advantage where the soldered parts are relatively large or subjected to relatively heavy stresses.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. The method of joining together two metal members for assembly into a vacuum-tight structure of an electron discharge tube or the like, at least one of said metal members consisting of an alloy of the class commercially known as Kovar and comprising as its principal constituents cobalt, nickel, and iron, in the proportion of 10 to 20 percent cobalt, 20 to 35 percent nickel, and the balance substantially iron, with other elements being of the order of 1 per cent or less, the method including the steps of plating the Kovar member with a thin layer of nickel over the area to be joined to the other member to provide a barrier against intergranular penetration of silver into the Kovar member, and silver soldering the other member thereto with a hard solder comprising copper and an appreciable amount of silver.

2. The method of joining two metallic members together where one of said members consists of an alloy of 10 to 20 percent cobalt, 20 to 35 per cent nickel, and the balance substantially iron, said alloy member being part of a dividing wall between regions of high and low pressure of an electron discharge tube or the like, the method including the steps of plating a thin nickel layer on said alloy member, and melting a solder containing a high percentage of silver between the coated surface of the alloy member and the other member for joining the two members structurally, the nickel layer serving to prevent physical cracking of the alloy by intrusion of the silver into the alloy member with resultant leakage between the high and low pressure regions.

3. In a vacuum-tight envelope for an electron discharge tube or the like, the combination of a first metallic member and a second metallic member, the first metallic member being an alloy including 20 to 35 percent nickel, 10 to 20 percent cobalt, and the balance substantially of iron, a thin layer of nickel on the surface of the alloy member, and a body of hard solder having a high percentage of silver joining the two members in a gas-tight joint, the layer of nickel separating the body of hard solder from the alloy member to prevent penetration of the silver into the alloy.

4. A gas-tight joint in an electron discharge tube or the like, comprising a first metallic member of an alloy including 20 to 35 percent nickel, 10 to 20 percent cobalt, and the balance substantially of iron, a second metallic member, a thin layer of nickel on the first member in the region of the joint, and a body of solder including a high percentage of silver between the second member and the layer of nickel, said layer of nickel separating the body of solder from the first member to prevent penetration of the silver into the alloy.

References Cited in the file of this patent

UNITED STATES PATENTS

| Number | Name | Date |
|---|---|---|
| 1,804,237 | Steenstrup | May 5, 1931 |
| 2,123,384 | Silliman | July 12, 1938 |
| 2,330,062 | Lempert | Sept. 21, 1943 |
| 2,394,398 | Mouromtseff et al | Feb. 5, 1946 |
| 2,408,271 | Rigrod et al. | Sept. 24, 1946 |
| 2,456,653 | Snow et al. | Dec. 21, 1948 |

FOREIGN PATENTS

| Number | Country | Date |
|---|---|---|
| 457,755 | Great Britain | Sept. 9, 1942 |